US011095349B2

(12) United States Patent
Cho

(10) Patent No.: US 11,095,349 B2
(45) Date of Patent: Aug. 17, 2021

(54) ELECTRONIC DEVICE FOR SELECTING ANTENNA TO SUPPORT DESIGNATED RADIO COMMUNICATION AMONG PLURALITY OF ANTENNAS

(71) Applicant: Samsung Electronics Co., Ltd., Gyeonggi-do (KR)

(72) Inventor: Namjun Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/905,346

(22) Filed: Jun. 18, 2020

(65) Prior Publication Data

US 2020/0403671 A1 Dec. 24, 2020

(30) Foreign Application Priority Data

Jun. 19, 2019 (KR) ........................ 10-2019-0073114

(51) Int. Cl.
*H04L 5/12* (2006.01)
*H04B 7/06* (2006.01)
(Continued)

(52) U.S. Cl.
CPC ............ *H04B 7/0608* (2013.01); *H01Q 5/35* (2015.01); *H04B 1/006* (2013.01); *H04B 1/0064* (2013.01); *H04B 1/04* (2013.01); *H04B 1/1027* (2013.01)

(58) Field of Classification Search
CPC .... H04B 7/0608; H04B 1/006; H04B 1/0064; H04B 1/04; H04B 1/1027; H01Q 5/35
(Continued)

(56) References Cited

U.S. PATENT DOCUMENTS 9,363,849 B2 6/2016 Yan et al.
9,867,194 B2 1/2018 Kadous et al.
(Continued)

FOREIGN PATENT DOCUMENTS

CN 108432043 8/2018
EP 3 442 077 2/2019
(Continued)

OTHER PUBLICATIONS

International Search Report dated Sep. 21, 2020 issued in counterpart application No. PCT/KR2020/007874, 3 pages.
(Continued)

*Primary Examiner* — Zewdu A Kassa
(74) *Attorney, Agent, or Firm* — The Farrell Law Firm, P.C.

(57) ABSTRACT

An electronic device includes antennas, first radio frequency front ends (RFFEs) configured to pre-process a an RF signal having a frequency belonging to a first frequency band, second RFFEs connected to the antennas, respectively, wherein at least one of the second RFFEs is configured to pre-process an RF signal having a frequency belonging to a second frequency band different from the first frequency band, switches selectively connecting the first RFFEs to the respective antennas, a communication processor operatively coupled to the first RFFEs, the second RFFEs and the switches, and a memory storing instructions that, when executed, cause the processor to select a first antenna to support radio communication using the first frequency band among the antennas and control the switches to connect one of the first RFFEs to the first antenna and to open a connection between a remainder of the first RFFEs and a remainder of the antennas.

18 Claims, 6 Drawing Sheets

(51) Int. Cl.
  *H01Q 5/35*    (2015.01)
  *H04B 1/00*    (2006.01)
  *H04B 1/04*    (2006.01)
  *H04B 1/10*    (2006.01)

(58) Field of Classification Search
  USPC ................ 375/262, 261, 259, 316, 295, 219
  See application file for complete search history.

(56) References Cited

U.S. PATENT DOCUMENTS

| | | | |
|---|---|---|---|
| 9,893,758 | B2 | 2/2018 | HomChaudhuri et al. |
| 2010/0120466 | A1 | 5/2010 | Li |
| 2011/0250926 | A1 | 10/2011 | Wietfeldt et al. |
| 2013/0094601 | A1 | 4/2013 | Chang |
| 2015/0340769 | A1 | 11/2015 | Desclos et al. |
| 2016/0066307 | A1 | 3/2016 | Huang et al. |
| 2016/0174293 | A1 | 6/2016 | Mow et al. |
| 2016/0248451 | A1 | 8/2016 | Weissman et al. |
| 2017/0077983 | A1 | 3/2017 | Ella et al. |
| 2017/0187431 | A1 | 6/2017 | Zhu |
| 2017/0244818 | A1 | 8/2017 | Kim et al. |
| 2017/0365914 | A1 | 12/2017 | Hong et al. |
| 2019/0036217 | A1* | 1/2019 | Presti .................... H01Q 5/328 |
| 2019/0190583 | A1* | 6/2019 | Natarajan ............ H04B 7/0814 |
| 2019/0305831 | A1* | 10/2019 | Freisleben ........... H04B 1/0057 |

FOREIGN PATENT DOCUMENTS

| | | |
|---|---|---|
| JP | 2017512020 | 4/2017 |
| KR | 101537644 | 7/2015 |
| KR | 1020180036945 | 4/2018 |
| KR | 1020190060520 | 6/2019 |
| WO | WO 2017/175964 | 10/2017 |

OTHER PUBLICATIONS

European Search Report dated Oct. 11, 2020 issued in counterpart application No. 20180756.7-1220, 8 pages.
Chinese Office Action dated Mar. 18, 2021 issued in counterpart application No. 202010566571.7, 18 pages.

* cited by examiner

ELECTRONIC DEVICE FOR SELECTING ANTENNA TO SUPPORT DESIGNATED RADIO COMMUNICATION AMONG PLURALITY OF ANTENNAS

CROSS-REFERENCE TO RELATED APPLICATION

This application is based on and claims priority under 35 U.S.C. 119 to Korean Patent Application Serial No. 10-2019-0073114, filed on Jun. 19, 2019, in the Korean Intellectual Property Office, the entire disclosure of which is incorporated herein by reference.

BACKGROUND

1. Field

The present disclosure relates generally to an electronic device configured to support various radio communications using a plurality of antennas.

2. Description of Related Art

An electronic device (e.g., smartphone) may be equipped with a plurality of antennas in order to support various radio communications (e.g., 5G, long term evolution (LTE), wireless fidelity (WiFi) or GPS). There may be limits to a space in mounting antennas on an electronic device (e.g., a smartphone).

Radio frequency front ends (RFFEs) having different types or different supported frequency bands may be mounted on an electronic device. One of a plurality of antennas formed in the electronic device may be shared. Accordingly, the number of antennas can be reduced. For example, the RFFEs may be connected to one antenna through an electronic part (e.g., a diplexer and/or an extractor) for dividing an RF signal for each frequency band.

Electronic parts, such as a diplexer and an extractor, contribute to reducing the number of antennas to be mounted on an electronic device, but may cause a loss (e.g., an insertion loss or a line loss) of an RF signal because the electronic parts are disposed near an antenna or in a board (e.g., a printed circuit board (PCB)). For example, an insertion loss and a line loss may be combined to degrade a sudden decrease in antenna performance. If several RFFEs are connected to one antenna by excluding such an electronic part, antenna performance may be degraded due to interference (e.g., intermodulation, harmonics or blocker) between RF signals. As communication technologies in which one antenna is shared are increased, several diplexers and extractors may be disposed in a board. Accordingly, the space for mounting electronic parts within an electronic device may be insufficient.

SUMMARY

The present disclosure has been made to address at least the disadvantages described above and to provide at least the advantages described below.

In accordance with an aspect of the present disclosure, an electronic device is provided. The electronic device includes a first antenna, a second antenna spaced apart from the first antenna, an RFFE electrically connected to the first antenna and configured to pre-process an RF signal having a frequency belonging to a first frequency band, a second RFFE connected to the second antenna and configured to pre-process an RF signal having a frequency belonging to a second frequency band different from the first frequency band, a third RFFE and a fourth RFFE configured to pre-process an RF signal having a frequency belonging to a third frequency band different from the first frequency band and the second frequency band, a first switch positioned in a first conductive path electrically connecting the first antenna and the third RFFE, a second switch positioned in a second conductive path electrically connecting the second antenna and the fourth RFFE, and a communication processor electrically connected to the first switch and the second switch and configured to control the first switch and the second switch and to transmit and/or receive a signal having a frequency belonging to at least one of the first frequency band, the second frequency band or the third frequency band.

In accordance with an aspect of the present disclosure, an electronic device is provided. The electronic device includes antennas, first RFFEs configured to pre-process a an RF signal having a frequency belonging to a first frequency band, second RFFEs connected to the antennas, respectively, wherein at least one of the second RFFEs is configured to pre-process an RF signal having a frequency belonging to a second frequency band different from the first frequency band, switches selectively connecting the first RFFEs to the respective antennas, a communication processor operatively coupled to the first RFFEs, the second RFFEs and the switches, and a memory operatively coupled to the communication processor. The memory stores instructions that, when executed, cause the communication processor to select a first antenna to support radio communication using the first frequency band among the antennas and control the switches to connect one of the first RFFEs to the first antenna and to open a connection between a remainder of the first RFFEs and a remainder of the antennas.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
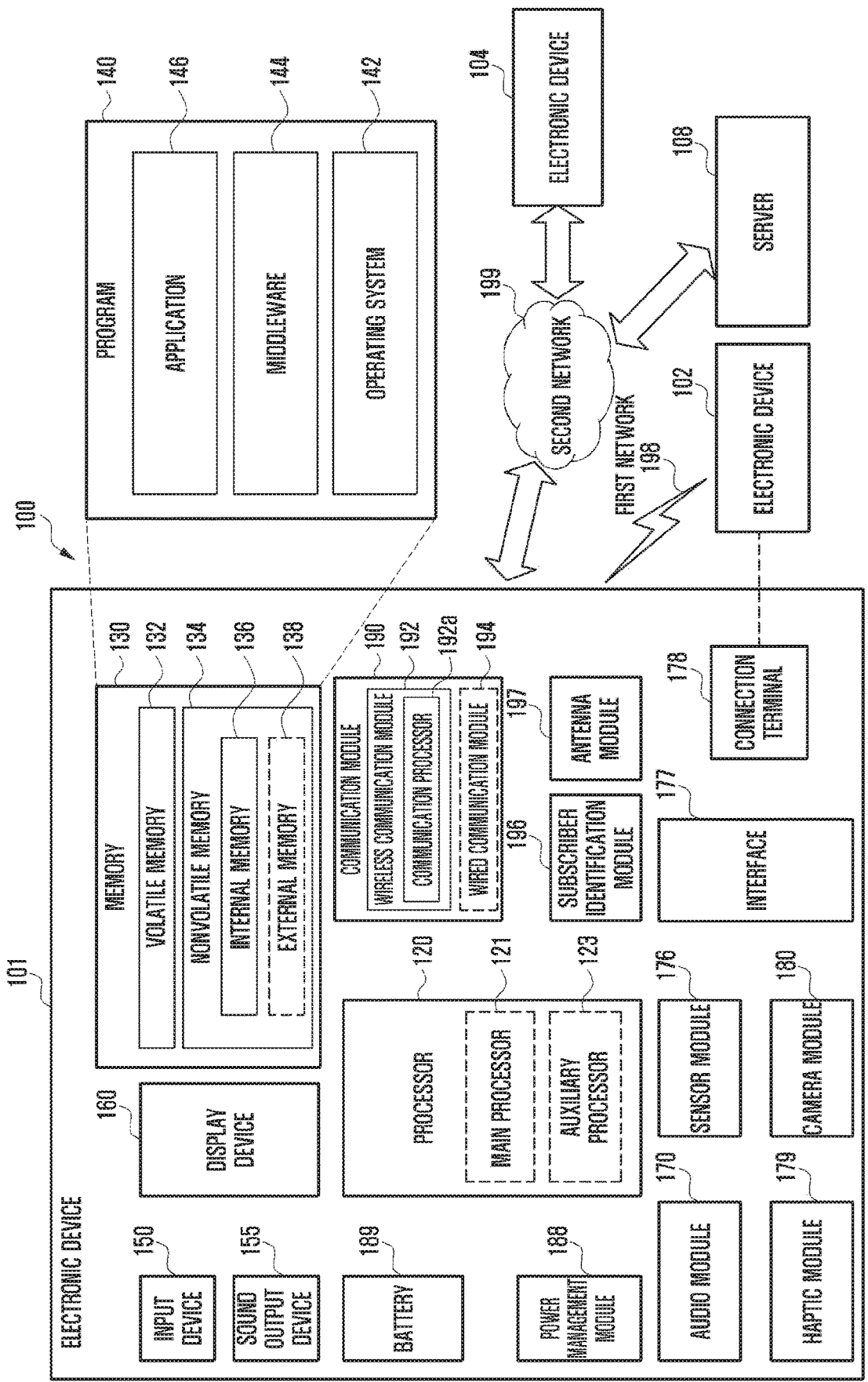
FIG. 1 is a block diagram of an electronic device within a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," " adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a CPU or an AP), and an auxiliary processor 123 (e.g., a graphics processing unit (GPU), an image signal processor (ISP), or a sensor hub processor) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a communication processor (CP)) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may comprise a CP 192a for supporting wireless communication. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a diplexer and/or an extractor) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
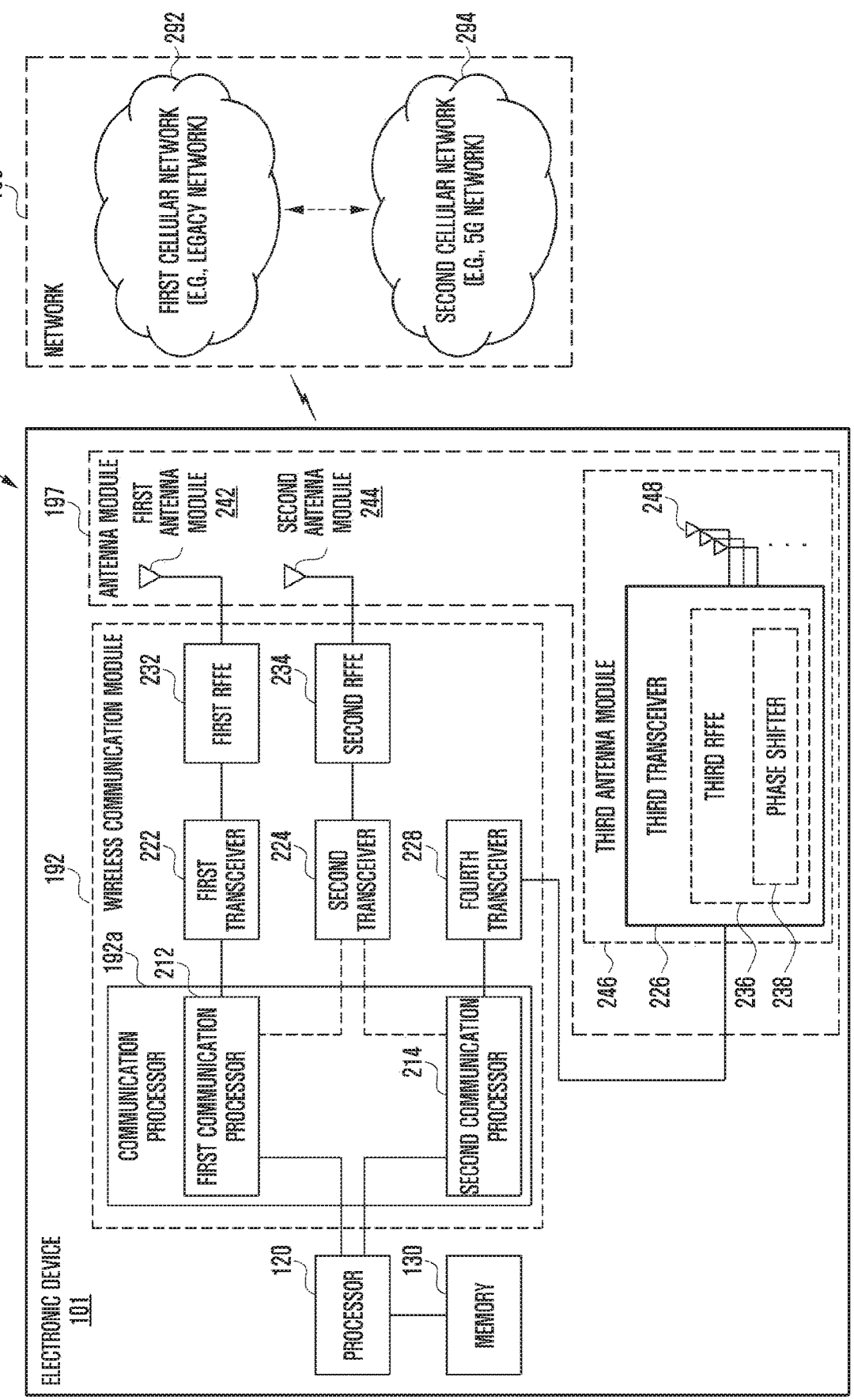
FIG. 2 is a block diagram of an electronic device for supporting legacy network communication and 5G network communication, according to an embodiment.

FIG. 2 is a block diagram 200 of an electronic device 101 for supporting legacy network communication and 5G network communication according to various embodiments.

Referring to FIG. 2, the electronic device 101 may include a first CP 212, a second CP 214, a first transceiver 222, a second transceiver 224, a third transceiver 226, a fourth transceiver 228, a first radio frequency front end (RFFE) 232, a second RFFE 234, a first antenna module 242, a second antenna module 244, and an antenna 248. The electronic device 101 may further include a processor 120 and a memory 130.

The network 199 may include a first network 292 and a second network 294. According to another embodiment, the electronic device 101 may further include at least one component among the components illustrated in FIG. 1, and the network 199 may further include at least one different network. According to an embodiment, the first CP 212, the second CP 214, the first transceiver 222, the second transceiver 224, the fourth transceiver 228, the first RFFE 232, and the second RFFE 234 may form at least a part of the wireless communication module 192. According to another embodiment, the fourth transceiver 228 may be omitted or included as a part of the third transceiver 226.

The first CP 212 may support establishment of a communication channel in a band to be used for wireless communication with the first network 292, and legacy network communication through the established communication channel. According to various embodiments, the first network may be a legacy network including a 2G, 3G, 4G, or long term evolution (LTE) network. The second CP 214 may support establishment of a communication channel corresponding to a designated band (for example, about 6 GHz to about 60 GHz) among bands to be used for wireless communication with the second network 294, and 5G network communication through the established communication channel. According to various embodiments, the second network 294 may be a 5G network defined by third generation partnership project (3GPP). Additionally, according to an embodiment, the first CP 212 or the second CP 214 may support establishment of a communication channel corresponding to another designated band (for example, about 6 GHz or lower) among the bands to be used for wireless communication with the second network 294, and 5G network communication through the established communication channel. According to an embodiment, the first CP 212 and the second CP 214 may be implemented inside a single chip or a single package. According to various embodiments, the first CP 212 or the second CP 214 may be formed inside a single chip or a single package together with a processor 120, an auxiliary processor 123, or a communication module 190.

The first transceiver 222 may convert a baseband signal generated by the first CP 212 into a radio frequency (RF) signal at about 700 MHz to about 3 GHz, which is used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first transceiver 222 may convert the preprocessed RF signal into a baseband signal such that the same can be processed by the first CP 212.

The second transceiver 224 may convert a baseband signal generated by the first CP 212 or the second CP 214 into an RF signal in a Sub6 band (for example, about 6 GHz or lower) (hereinafter, referred to as a 5G Sub6 RF signal) that is used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second transceiver 224 may convert the preprocessed 5G Sub6 RF signal into a baseband signal such that the same can be processed by a communication processor corresponding to the first CP 212 or the second CP 214.

The third transceiver 226 may convert a baseband signal generated by the second CP 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third transceiver 226 may convert the preprocessed 5G Above6 signal into a baseband signal such that the same can be processed by the second CP 214. According to an embodiment, the third RFFE 236 may be formed as a part of the third transceiver 226.

According to an embodiment, the electronic device 101 may include a fourth transceiver 228 separately from the third transceiver 226 or as at least a part thereof. In this case, the fourth transceiver 228 may convert a baseband signal generated by the second CP 214 into an RF signal in an intermediate frequency band (for example, about 9 GHz to about 11 GHz) (hereinafter, referred to as an IF signal) and then deliver the IF signal to the third transceiver 226. The third transceiver 226 may convert the IF signal into a 5G Above6 RF signal. During reception, a 5G Above6 RF signal may be received from the second network 294 (for example, 5G network) through an antenna (for example, antenna 248) and converted into an IF signal by the third transceiver 226. The fourth transceiver 228 may convert the IF signal into a baseband signal such that the same can be processed by the second CP 214.

According to an embodiment, the first transceiver 222 and the second transceiver 224 may be implemented as at least a part of a single chip or a single package. According to an embodiment, the first RFFE 232 and the second RFFE 234 may be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third transceiver 226 and the antenna 248 may be arranged on the same substrate so as to form a third antenna module 246. For example, the wireless communication module 192 or the processor 120 may be arranged on a first substrate (for example, main PCB). In this case, the third transceiver 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third transceiver 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may be formed as an antenna array including multiple antenna elements that may be used for beamforming. In this case, the third transceiver 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include only an access network (for example, 5G radio access network (RAN) or next-generation network (NG RAN)) and include no core network (for example, next-generation core (NGC)). In this case, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first CP 212, or the second CP 214).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
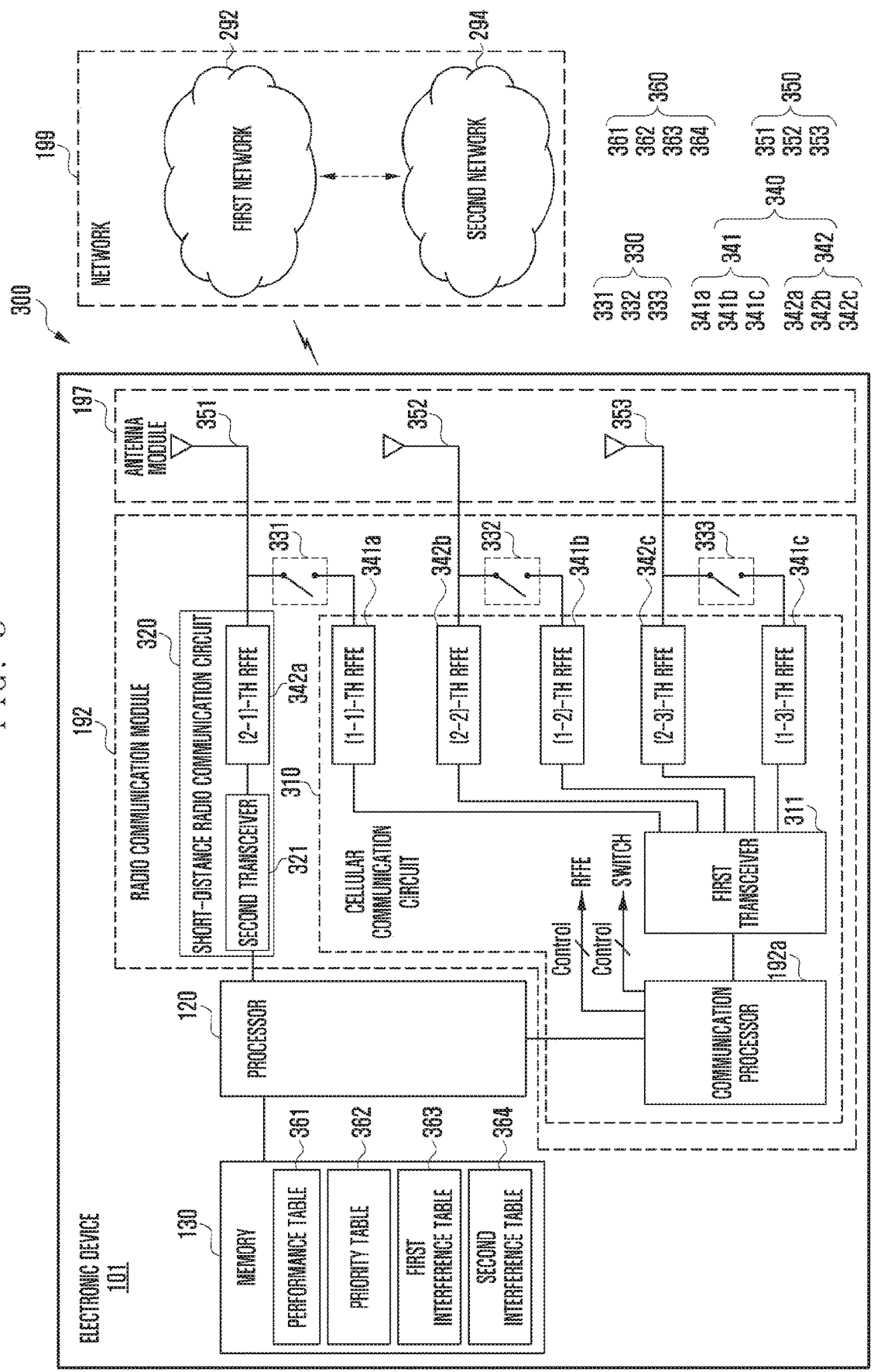
FIG. 3 is a block diagram of an electronic device configured to select an antenna to perform radio communication among plurality of antennas and to perform radio communication using the selected antenna, according to an embodiment.

FIG. 3 is a diagram 300 of the electronic device 101 configured to select an antenna to perform radio communication among plurality of antennas and to perform radio communication using the selected antenna, according to an embodiment. A description that overlaps that of FIG. 1 is omitted or briefly given. Referring to FIG. 3, the radio communication module 192 may include a cellular communication circuit 310, a short-distance radio communication circuit 320 and/or a plurality of switches 330. The cellular communication circuit 310 may include a communication processor 192a, a first transceiver 311, and a plurality of RFFEs 341, 342b, and 342c. The short-distance radio communication circuit 320 may include a second transceiver 321 or an RFFE 342a. The antenna module 197 may include a plurality of antennas 350.

Each of the first RFFEs 341 of the RFFEs 340 may be selectively connected to one of the antennas 350 through one of the switches 330. The (1-1)-th RFFE 341a may be connected to an antenna A 351 or disconnected from the antenna A 351 by a first switch 331 positioned in a conductive path that connects the antenna A 351 and the (1-1)-th RFFE 341a. The (1-2)-th RFFE 341b may be connected to an antenna B 352 or disconnected from the antenna B 352 by a second switch 332 positioned in a conductive path that connects the antenna B 352 and the (1-2)-th RFFE 341b. The (1-3)-th RFFE 341c may be connected to an antenna C 353 or disconnected from the third antenna C 353 by a third switch 333 positioned in a conductive path that connects the antenna C 353 and the (1-3)-th RFFE 341c. The second RFFEs 342 of the RFFEs 340 may be fixedly connected to the antennas 350, respectively. The (2-1)-th RFFE 342a may be fixedly connected to the antenna A 351, the (2-2)-th RFFE 342b may be fixedly connected to the antenna B 352, and the (2-3)-th RFFE 342c may be fixedly connected to the antenna C 353.

The first RFFEs 341 may be configured to pre-process an RF signal having a designated first frequency band. When receiving an RF signal from the outside of the electronic device 101, the (1-1)-th RFFE 341a may be configured to pre-process a 5G Sub6 RF signal received from a second network 294 through the antenna A 351. Upon reception, the (1-2)-th RFFE 341b may be configured to pre-process a 5G Sub6 RF signal received from the second network 294 through the antenna B 352. Upon reception, the (1-3)-th RFFE 341c may be configured to pre-process a 5G Sub6 RF signal received from the second network 294 through the antenna C 353. When transmitting an RF signal to the outside of the electronic device 101, the first RFFEs 341 may be configured to pre-process a 5G Sub6 RF signal received from the first transceiver 311. When receiving an RF signal from the outside of the electronic device 101, the first RFFEs 341 may be configured to pre-process an RF signal having a frequency belonging to a frequency band (e.g., LTE band) of a legacy network received from a first network 292. When transmitting an RF signal to the outside of the electronic device 101, the first RFFEs 341 may be configured to pre-process an RF signal having a frequency belonging to a frequency band of a legacy network received from the first transceiver 311.

The (2-1)-th RFFE 342a may be configured to pre-process an RF signal having a frequency belonging to having a designated frequency band so that the RF signal is used in short-distance radio communication. The frequency band of the RF signal pre-processed by the (2-1)-th RFFE 342a may at least partially overlap the first frequency band. Frequency bands (e.g., n77 (about 3.3~4.2 GHz) and/or n79 (about 4.4~5 GHz)) designated to be used in 5G network communication may be designated as a first frequency band, and may at least partially overlap the WiFi band (e.g., about 5 GHz) of an RF signal pre-processed by the (2-1)-th RFFE 342a. Upon reception, the (2-1)-th RFFE 342a may be configured to pre-process an RF signal of a WiFi band (e.g., about 2.4 GHz and/or about 5 GHz) received from an external electronic device (e.g., access point) through the antenna A 351. Upon transmission, the (2-1)-th RFFE 342a may be configured to pre-process an RF signal of a WiFi band received from the second transceiver 321.

The (2-2)-th RFFE 342b and (2-3)-th RFFE 342c may be configured to pre-process an RF signal of a designated second frequency band. The second frequency band may be different from the first frequency band. Frequency bands (e.g., n77 (about 3.3~4.2 GHz) and/or n79 (about 4.4~5 GHz)) designated to be used in 5G network communication may be designated as the first frequency band. A frequency band (e.g., LTE band) designated to be used in legacy network communication may be designated as the second frequency band.

Upon reception, the (2-2)-th RFFE 342b or (2-3)-th RFFE 342c may be configured to pre-process an RF signal of a frequency band (e.g., LTE band) of a legacy network received from the first network 292 through the antenna B 352 or the antenna C 353. Upon transmission, the (2-2)-th RFFE 342b and (2-3)-th RFFE 342c may be configured to pre-process an RF signal of a band (e.g., LTE band) of a legacy network received from the first transceiver 311. The (2-2)-th RFFE 342b and (2-3)-th RFFE 342c may have different frequency bands to be pre-processed. One of the (2-2)-th RFFE 342b and (2-3)-th RFFE 342c may be responsible for the pre-processing of an RF signal of a low band (LB) (e.g., about 1.0 GHz or less) of LTE. The other of the (2-2)-th RFFE 342b and (2-3)-th RFFE 342c may be responsible for the pre-processing of an RF signal of a middle band (MB) (e.g., about 1~2.1 GHz) and an RF signal of a high band (HB) (e.g., about 2.1~2.7 GHz). The (2-2)-th RFFE 342b and (2-3)-th RFFE 342c may be configured to pre-process an RF signal of the same frequency band (e.g., MB and HB (hereinafter referred to as an "MHB")).

Each of the RFFEs 340 may include a reception circuit and/or a transmission circuit, and may operate in a reception mode or transmission mode based on a control signal received from a processor (e.g., the communication processor 192a). The reception circuit may include at least one amplification circuit (e.g., low noise amplifier or variable gain amplifier) for amplifying an RF signal received from an antenna connected to the reception circuit. The reception circuit may further include a bandpass filter (e.g., surface acoustic wave (SAW) filter) for filtering an RF signal of a designated frequency band from the amplified RF signal and outputting the filtered signal to a transceiver connected to the reception circuit. The transmission circuit may include at least one amplification circuit (e.g., driver amplifier and/or power amplifier) for amplifying an RF signal received from a transceiver connected to the transmission circuit and outputting the amplified signal to an antenna connected to the transmission circuit.

At least one of RFFEs except the (2-1)-th RFFE 342a may be an element of the first RFFE 232 of FIG. 2. At least one of the antennas 350 may be an element of the first antenna module 242 of FIG. 2.

Upon transmission, the first transceiver 311 may convert, into an RF signal, a baseband signal received from the communication processor 192a, and may output an RF signal to an RFFE of the cellular communication circuit 310. Upon reception, the first transceiver 311 may convert, into a baseband signal, an RF signal received from an RFFE of the cellular communication circuit 310, and may output the baseband signal to the communication processor 192a.

Upon transmission, the second transceiver 321 may convert, into an RF signal, a baseband signal received from the processor 120 (e.g., an AP), and may output the RF signal to the (2-1)-th RFFE 342a. Upon reception, the second transceiver 321 may convert, into a baseband signal, an RF signal received from the (2-1)-th RFFE 342a, and may output the baseband signal to the processor 120.

When a 5G sub6 RF signal is transmitted or received through an RFFE (e.g., the second RFFE 234 in FIG. 2), the communication processor 192a may use at least one of the first RFFEs 341 as auxiliary means (e.g., diversity receiver (DRX)) for receiving the 5G sub6 RF signal.

The memory 130 may store a performance table 361 indicative of performance of antennas (e.g., the antennas 350) when an RF signal of a first frequency band (e.g., 5G sub6 band) is received. While the electronic device 101 is booted (e.g., while the processor 120 loads the operation system 142 onto the volatile memory 132), the processor 120 (e.g., an AP) may initialize the state of the performance table 361 as the state in which the performance table 361 is first stored in the memory 130. The communication processor 192a may identify the initialized performance table 361 through the processor 120. Furthermore, the communication processor 192a may identify information (e.g., the type of designated radio communication, a frequency band designated to be used for corresponding radio communication, and ID information of an antenna (e.g., the antenna A 351) connected to the (2-1)-th RFFE 342a) of the (2-1)-th RFFE 342a through the processor 120. While the electronic device 101 is booted, the communication processor 192a may identify information (e.g., a type, a frequency band, and ID information of an antenna (e.g., the antenna B 352 and the antenna C 353) connected (or connectable) to a corresponding RFFE) of other RFFEs 341, 342b, and 342c. The communication processor 192a may recognize that the first RFFEs 341 has been configured to pre-process an RF signal of a first frequency band based on the identified information of the first RFFEs 341. The communication processor 192a may recognize that the (2-1)-th RFFE 342a has been configured to support short-distance radio communication and the (2-2)-th RFFE 342b and the (2-3)-th RFFE 342c have been configured to pre-process an RF signal of a second frequency band based on the identified information of the second RFFEs 342. The communication processor 192a may select, among the antennas 350, a first antenna to support the reception of an RF signal of a first frequency band (e.g., 5G sub6 band) based on performance of the antennas 350 identified from the performance table 361. The communication processor 192a may control the switches 330 to connect one of the first RFFEs 341 to the first antenna, and may open a connection between the remainder of the first RFFEs 341 and unselected antennas. Based on the selection of the antenna A 351 as a first antenna, the communication processor 192a may control the RFFEs 340 so that the (1-1)-th RFFE 341a is activated and other RFFEs 341b, 341c, and 342 are deactivated. The communication processor 192a may control the first switch 331 to connect the (1-1)-th RFFE 341a to the antenna A 351, and may control the second switch 332 and the third switch 333 to open a connection between the (1-2)-th RFFE 341b and the antenna B 352 and a connection between the (1-3)-th RFFE 341c and the antenna C 353. The (1-1)-th RFFE 341a may pre-process an RF signal of a first frequency band (e.g., 5G sub6 band) received from the second network 294 through the antenna A 351, and may output the RF signal to the first transceiver 311.

The performance table 361 may include information indicative of performance of antennas 350 for each radio communication. Radio communications which may be identified in the performance table 361 may be classified based on a corresponding type (e.g., WiFi, GPS, LTE or 5G) and a frequency band designated to be used for corresponding radio communication. The memory 130 may further include a priority table 362 indicative of the priority of radio communications, a first interference table 363 indicative of an influence exerted on performance of another antenna for each antenna, and a second interference table 364 indicative of the influence of one radio communication exerted on performance of the other radio communication when the two radio communications share one antenna using a time or frequency division method. The two radio communications that share one antenna may have different types and/or different frequency bands. The two radio communications that share one antenna may have the same type and the same frequency band. The communication processor 192a may support multiple radio communications (e.g., multiple input multiple output (MIMO)) for the transmission and/or reception of RF signals that have the same type and frequency band, but are independent using one antenna. While the electronic device 101 is booted, the communication processor 192a may identify at least one of the tables 360 through the processor 120. Alternatively, after booting is completed, when a communication method is changed (e.g., when the type of radio communication and/or a frequency band designated to be used for radio communication is changed), the communication processor 192a may initialize the performance table 361, and may identify at least one of other tables 362, 363, and 364 through the processor 120. The communication processor 192a may recognize a change in a communication method based on a control signal received from the processor 120.

The communication processor 192a may support a plurality of radio communications using at least one of the tables 360. For example, operations of the communication processor 192a for supporting a plurality of radio communications are as follows. The communication processor 192a may determine priority of radio communications to be supported based on the priority table 362. The radio communications to be supported may be a first radio communication (e.g., 5G network communication) and/or a second radio communication (e.g., WiFi). The second radio communication may have higher priority than the first radio communication. The communication processor 192a may initialize the state of the performance table 361 (e.g., update the performance table 361 as a state checked upon booting) or may identify an initialized performance table 361 through the processor 120. The communication processor 192a may select, among the antennas 350, a second antenna to support a second radio communication based on the initialized performance table 361. The communication processor 192a may update the performance table 361 using at least one of the interference tables 363 and 364 based on the selection of the second antenna. The communication processor 192a may select a first antenna to support the first radio communication based on the updated performance table 361. The first antenna may be the same as or different from the second antenna. The communication processor 192a may determine the support of the first radio communication and the second radio communication through one antenna or may determine the support of the first radio communication and the second radio communication through different antennas based on the updated performance table 361. The communication processor 192a may control the switches 330 to connect one of the first RFFEs 341 to the first antenna selected to support the first radio communication, and may open a connection between the remainder of the first RFFEs 341 and unselected antennas. Based on the selection of the antenna A 351 for use in WiFi communication (e.g., second radio communication) and the selection of the antenna B 352 for use in 5G network communication (e.g., first radio communication), the communication processor 192a may control the RFFEs 340 so that the (2-1)-th RFFE 342a and the (1-2)-th RFFE 341b are activated and other RFFEs 341a, 341c, 342b, and 342c are deactivated. The communication processor 192a may control the second switch 332 to connect the (1-2)-th RFFE 341b to the antenna B 352, and may control the second switch 332 and the third switch 333 to open a connection between the (1-1)-th RFFE 341a and the antenna A 351 and a connection between the (1-3)-th RFFE 341c and the antenna C 353. The (2-1)-th RFFE 342a may pre-process an RF signal received from an external electronic device through the antenna A 351, and may output the RF signal to the second transceiver 321. The (1-2)-th RFFE 341b may pre-process an RF signal that has a first frequency band (e.g., 5G sub6 band) and that has been received from the network 199 through the antenna B 352, and may output the RF signal to the first transceiver 311.

The communication processor 192a may support multiple radio communications (e.g., MIMO) for the transmission and/or reception of RF signals that have the same type and band, but are independent using one or more of the antennas 350. Accordingly, radio communications which may be identified in the tables 360 may be classified further based on ID information related to multiple radio communications. One of the multiple radio communications may be identified as N77 (NR frequency band 77), and the other thereof may be identified as N77_2.

Figure 4:
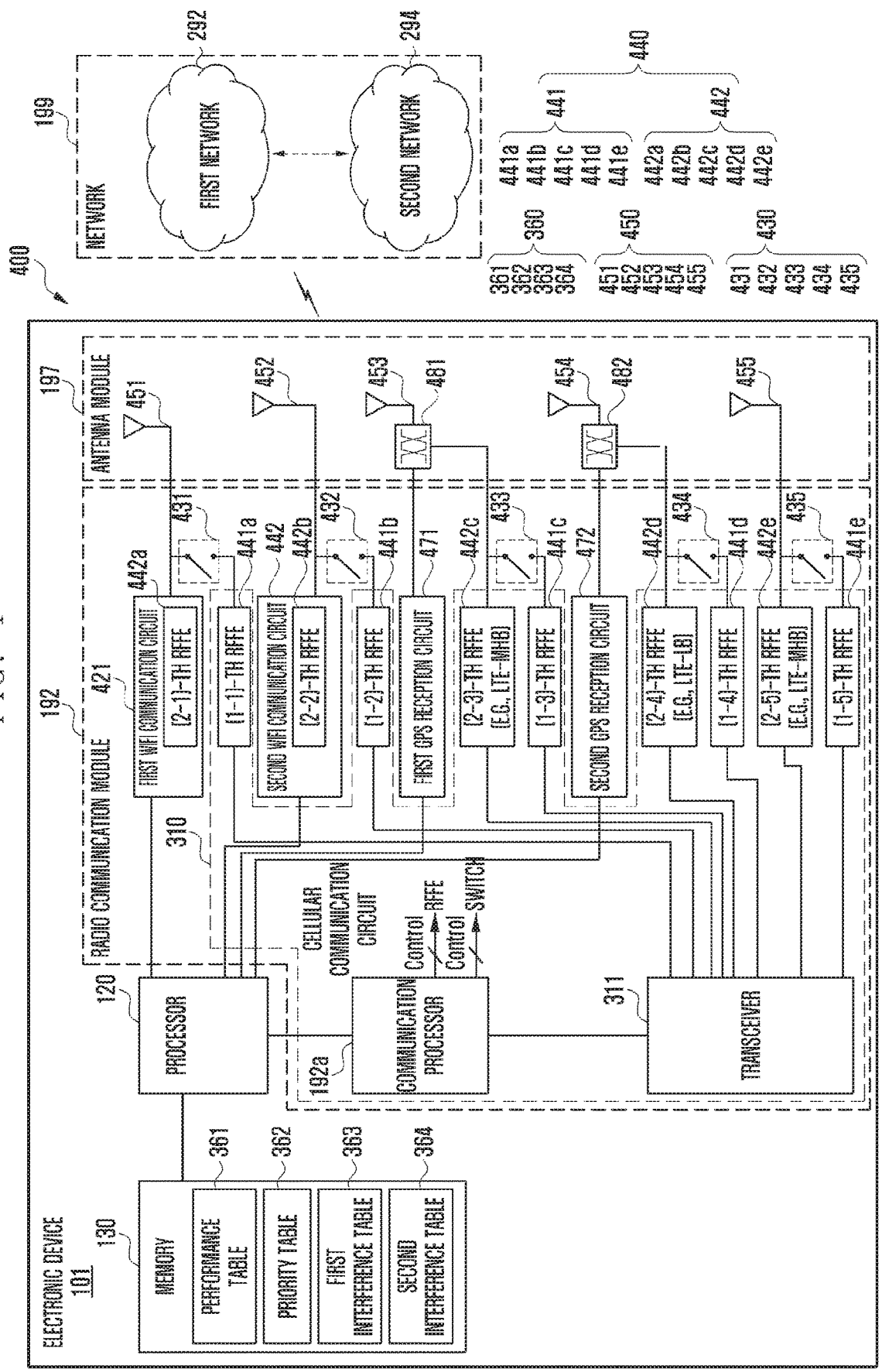
FIG. 4 is a block diagram of an electronic device configured to select an antenna to support radio communication among a plurality of antennas and to perform radio communication using the selected antenna, according to an embodiment.

FIG. 4 is a diagram 400 of the electronic device 101 configured to select an antenna to support radio communication among a plurality of antennas and to perform radio communication using the selected antenna, according to an embodiment. A description that overlaps that of FIGS. 1 and 3 is omitted or given in brief. Referring to FIG. 4, a radio communication module 192 may include a cellular communication circuit 310, a first WiFi communication circuit 421, a second WiFi communication circuit 442, a first GPS reception circuit 471, a second GPS reception circuit 472 and/or a plurality of switches 430. The cellular communication circuit 310 may include a communication processor 192a, a transceiver 311, and a plurality of RFFEs 441, 442c, 442d, and 442e. The first WiFi communication circuit 421 may include a transceiver (not illustrated) and a (2-1)-th RFFE 442a. The second WiFi communication circuit 442 may include a transceiver (not illustrated) and a (2-2)-th RFFE 442b. Each of the first GPS reception circuit 471 and/or the second GPS reception circuit 472 may be configured to convert, into a signal of a baseband, a GPS signal received from an antenna module 197 and to output the signal to a processor 120. The antenna module 197 may include a plurality of antennas 450 or a plurality of extractors 481 and 482.

Each of the first RFFEs 441 of the RFFEs 440 may be selectively connected to one of the antennas 450 through one of the switches 430. The second RFFEs 442 of the RFFEs 440 may be fixedly connected to the antennas 450, respectively.

The first RFFEs 441 may be configured to pre-process an RF signal of a first frequency band (e.g., frequency band (e.g., n77 (about 3.3~4.2 GHz) and/or n79 (about 4.4∫5 GHz) designated to be used in 5G network communication). The (2-1)-th RFFE 442a and (2-3)-th RFFE 442b of the second RFFEs 442 may be configured to pre-process an RF signal of a frequency band (e.g., about 2.4 GHz and/or 5 GHz) designated to be used in WiFi communication. The (2-3)-th RFFE 442c, (2-4)-th RFFE 442d and (2-5) RFFE 442e of the second RFFEs 442 may be configured to pre-process an RF signal of a second frequency band (e.g., a frequency band (e.g., LTE band) designated to be used in legacy network communication).

At least one of RFFEs except the (2-1)-th RFFE 442a and the (2-2)-th RFFE 442b may be an element of the first RFFE 232 in FIG. 2. At least one of the antennas 450 may be an element of the first antenna module 242 in FIG. 2.

The first extractor 481 may be configured to extract a first GPS signal (e.g., L1 band (about 1575.42 MHz)) from an RF signal received from an antenna C 453 and to output the first GPS signal to the first GPS reception circuit 471. The second extractor 482 may be configured to extract a second GPS signal (e.g., L5 band (about 1176.45 MHz)) from an RF signal received from an antenna D 454 and to output the second GPS signal to the second GPS reception circuit 372.

A performance table 361 may be initialized like Table 1 and stored in the memory 130. In Table 1, ANT1, ANT2, ANT3, ANT4, and ANT5 may denote an antenna A 451, an antenna B 452, the antenna C 453, the antenna D 454, and an antenna E 455. In Table 1, a value assigned to each item may be initialized as a score (e.g., score=50+efficiency in dB) based on performance (e.g., efficiency) of an antenna when radio communication is performed in a standalone way.

TABLE 1

| No. | Radio communication | ANT1 | ANT2 | ANT3 | ANT4 | ANT5 |
|---|---|---|---|---|---|---|
| 1 | WiFi_2G | 35 | 45 | 20 | 0 | 0 |
| 2 | WiFi_5G | 45 | 35 | 20 | 0 | 0 |
| 3 | WiFi_2G_2 | 35 | 45 | 20 | 0 | 0 |
| 4 | WiFi_5G_2 | 45 | 35 | 20 | 0 | 0 |
| 5 | GPS L1 | 0 | 0 | 45 | 0 | 0 |
| ... | | | | | | |
| 10 | LTE_B1 | 0 | 0 | 45 | 35 | 30 |
| 11 | LTE_B3 | 0 | 0 | 45 | 35 | 30 |
| 12 | LTE_B7 | 0 | 0 | 45 | 35 | 30 |
| 13 | 5G_n77 | 30 | 30 | 45 | 35 | 25 |
| 14 | 5G_n79 | 45 | 43 | 35 | 35 | 38 |
| 15 | LTE_B1_2 | 0 | 0 | 45 | 35 | 30 |
| 16 | LTE_B3_2 | 0 | 0 | 45 | 35 | 30 |
| 17 | 5G_n77_2 | 30 | 30 | 45 | 35 | 25 |
| 18 | 5G_n79_2 | 45 | 43 | 35 | 35 | 25 |
| ... | | | | | | |

A priority table 362 indicates priority for radio communications supported by the electronic device 101 like Table 2, and may be stored in the memory 130. Priority may be different depending on the type of application performed in the electronic device 101. Table 2 may be a table corresponding to a first application. Table 2 corresponding to a second application and another table 2 may be present.

TABLE 2

| No. | Radio communication | Priority |
|---|---|---|
| 1 | WiFi_2G | 1 |
| 2 | WiFi_5G | 1 |
| 3 | GPS L1 | 1 |
| 4 | WiFi_2G_2 | 2 |
| 5 | WiFi_5G_2 | 2 |
| ... | | |
| 10 | LTE_B1 | 3 |
| 11 | LTE_B3 | 3 |
| 12 | LTE_B7 | 3 |
| 13 | 5G_n77 | 3 |
| 14 | 5G_n79 | 3 |
| 15 | LTE_B1_2 | 4 |
| 16 | LTE_B3_2 | 4 |
| 17 | 5G_n77_2 | 4 |
| 18 | 5G_n79_2 | 4 |
| ... | | |

In Table 3, a first interference table 363 numerically indicates the degree that one antenna degrades performance of another antenna around the one antenna based on coupling between the antennas for each frequency band, and may be stored in the memory 130. In Table 3, a value assigned to each item does not need to be fixed to a value input in a design stage. The communication processor 192a may update the table by periodically monitoring an influence according to a method of using the electronic device 101 (e.g., a user holds the electronic device 101 by a hand or an accessory (e.g., earphone) is mounted on the electronic device 101).

TABLE 3

| ANT1 | | | | |
|---|---|---|---|---|
| Frequency (GHz) | ANT2 | ANT3 | ANT4 | ANT5 |
| LB (<1) | 0 | 0 | 0 | 0 |
| MB (1~2.1) | 0 | 0 | 0 | 0 |
| HB (2.1~2.7) | 0 | 0 | 0 | 0 |
| UHB (3.3~5) | 0 | 0 | 0 | 10 |

| ANT2 | | | | |
|---|---|---|---|---|
| Frequency (GHz) | ANT1 | ANT3 | ANT4 | ANT5 |
| LB (<1) | 0 | 0 | 0 | 0 |
| MB (1~2.1) | 0 | 0 | 0 | 0 |
| HB (2.1~2.7) | 0 | 0 | 0 | 0 |
| UHB (3.3~5) | 0 | 0 | 0 | 0 |

TABLE 3-continued

| ANT5 | | | | |
|---|---|---|---|---|
| Frequency (GHz) | ANT1 | ANT2 | ANT3 | ANT4 |
| LB (<1) | 0 | 0 | 0 | 0 |
| MB (1~2.1) | 0 | 0 | 0 | 0 |
| HB (2.1~2.7) | 0 | 0 | 0 | 10 |
| UHB (3.3~5) | 0 | 0 | 0 | 10 |

In Table 4, a second interference table 364 numerically indicates the influence of an aggressor on a victim If the other radio communication (victim) is activated to use the same antenna when one radio communication (aggressor) uses an antenna, and may be stored in the memory 130. The influence may include a reduction in the sensitivity of a victim attributable to the transmission characteristics of an aggressor and/or a loss (e.g., line loss) of an RF signal attributable to a switching change (e.g., the first switch 431 switches from an open state to a close state in order to use the (1-1)-th RFFE 441a in the state in which the (2-1)-th RFFE 442a has been activated). If WiFi_2G (aggressor) shares the same antenna as B7 (victim), when a line loss (IL) attributable to a switching change is 2 dB and a reduction in the sensitivity occurring in LTE_B7 due to the transmission characteristics of WiFi_2G is 5dB, in Table 4, an item (WiFi_2G, LTE_B7) may be written as 7(2+5). In Table 4, each item is a design value and thus does not need to be fixed. An influence exerted on a victim may be different depending on transmission power of an aggressor and the frequency band of a corresponding RF signal. Accordingly, the communication processor 192a may update the table by periodically monitoring a corresponding influence.

TABLE 4

| | | Victim | | | | | | | | | | | | | |
|---|---|---|---|---|---|---|---|---|---|---|---|---|---|---|---|
| | | WiFi 2G | WiFi 5G | GPS L1 | WiFi 2G_2 | WiFi 5G_2 | LTE B1 | LTE B3 | LTE B7 | 5G n77 | 5G n79 | LTE B1_2 | LTE B3_2 | 5G n77_2 | 5G n79_2 |
| aggressor | WiFi 2G_1 | | | | 100 | | | | 7 | | | | | 7 | |
| | WiFi 5G_1 | | | | | 100 | | | | | 15 | | | | 15 |
| | GPS L1 | | | | | | | | | | | | | | |
| | WiFi 2G_2 | 100 | | | | | | | | | | | | | |
| | WiFi 5G_2 | | 100 | | | | | | | | 10 | | | | 10 |
| | LTE B1 | 1 | 1 | | | | | | | | | | | | |
| | LTE B3 | 1 | 1 | | | | | | | | | | | | |
| | LTE B7 | | | | | | | | | | | | | | |
| | 5G n77 | | | | | | | | | | | | | | |
| | 5G n79 | | | | | | | | | | | | | | 100 |
| | LTE B1_2 | | | | | | 100 | | | | | | | | |
| | LTE B3_2 | | | | | | | 100 | | | | | | | |
| | 5G n77_2 | | | | | | | | | 100 | | | | | |
| | 5G n79_2 | | | | | | | | | | 100 | | | | |

Figure 5:
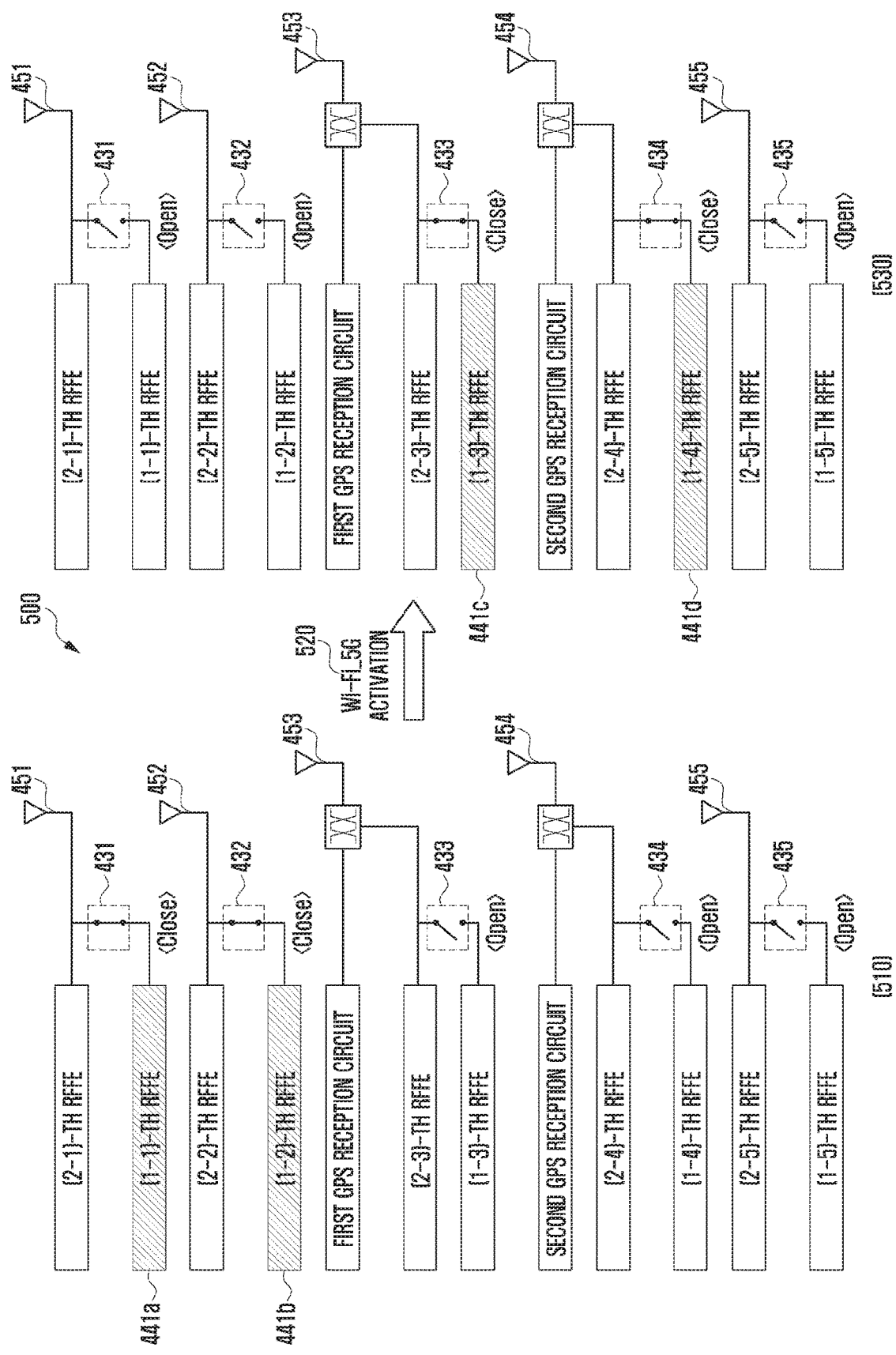
FIG. 5 is a diagram of operations of a communication processor in the electronic device including the elements of FIG. 4, according to an embodiment.

FIG. 5 is a diagram 500 for describing operations of the communication processor 192a in the electronic device 101 including the elements of FIG. 4, according to an embodiment.

The communication processor 192a may initialize the performance table 361 such as Table 1 while the electronic device 101 is booted. The communication processor 192a may determine "5G_n79" as radio communication that will be activated or will support MIMO based on a control signal received from the processor 120. The communication processor 192a may perform the following operations based on such a determination.

The communication processor 192a may determine to first assign an antenna to "5G_n79" rather than "5G_n79_2" based on Table 2. Accordingly, the communication processor 192a may select ANT1 (antenna A 451) as the antenna of "5G_n79" based on Table 1.

The communication processor 192a may update Table 1 based on Tables 3 and 4. The communication processor 192a may check, in Table 3, the influence "10" of ANT1 exerted on performance of ANT5 in the frequency band of 5G_n79. If ANT1 (antenna A 451) uses 5G_n79_2, the communication processor 192a may check, in Table 4, the influence "100" of 5G_n79 (aggressor) exerted on 5G_n79_2 (victim). The communication processor 192a may update Table 1 with Table 5 by subtracting "10" from the value "38" of the item (5G_n79_2, ANT5) in Table 1 and subtracting "100" from the value "45" of the item (5G_n79_2, ANT1) in Table 1 based on the results of the check.

TABLE 5

| No. | Radio communication | ANT1 | ANT2 | ANT3 | ANT4 | ANT5 |
|---|---|---|---|---|---|---|
| | --- | | | | | |
| 14 | 5G_n79 | 45 | 43 | 35 | 35 | 38 |
| | ... | | | | | |
| 18 | 5G_n79_2 | −55(45-100) | 43 | 35 | 35 | 28(38-10) |
| | ... | | | | | |

The communication processor 192a may select ANT2 (antenna B 452) as the antenna of "5G_n79_2" based on Table 5.

Referring to 510 in FIG. 5, the communication processor 192a may close a first switch 431 corresponding to ANT1 (antenna A 451) and a second switch 432 corresponding to ANT2 (antenna B 452). The communication processor 192a may open switches 433, 434, and 435 corresponding to unselected antennas 453, 454, and 455.

The communication processor 192a may recognize a change in a communication method, for example, the activation (520) of WiFi_5G and the MIMO support of WiFi_5G based on a control signal received from the processor 120. The communication processor 192a may perform the following operations based on such recognition.

The communication processor 192a may initialize the performance table 361 as Table 1. The communication processor 192a may determine WiFi_5G as a first priority, WiFi_5G_2 as a second priority, 5G_n79 as a third priority, and 5G_n79_2 as a fourth priority based on Table 2.

The communication processor 192a may select ANT1 (antenna A 451) as the antenna of the first priority (WiFi_5G) based on Table 1.

The communication processor 192a may check, in Table 3, the influence "10" of ANT 1 exerted on performance of ANT5 in a frequency band having the first priority (WiFi_5G). The communication processor 192a may subtract "10" from the value "0" of an item (WiFi_5G_2, ANT5), "10" from the value "38" of an item (5G_n79, ANT5), and "10" from the value "38" of an item (5G_n79_2, ANT5) in Table 1. When ANT1 is shared by the first priority and the second priority, the communication processor 192a may check, in Table 4, the influence "100" of the first priority (WiFi_5G) (aggressor) exerted on the second priority (WiFi_5G_2) (victim), and may incorporate the results of the check into the item (WiFi_5G_2, ANT1) in Table 1 (i.e., subtract 100 from 45). When the first priority and the third priority are shared by ANT1, the communication processor 192a may check, in Table 4, the influence "15" of the first priority (WiFi_5G) (aggressor) exerted on the third priority (5G_n79) (victim), and may incorporate the results of the check into the item (5G_n79, ANT1) in Table 1 (i.e., subtract 15 from 45). When the first priority and the fourth priority are shared by ANT1, the communication processor 192a may check, in Table 4, the influence "15" of the first priority (WiFi_5G) (aggressor) exerted on the fourth priority (5G_n79_2) (victim), and may incorporate the results of the check into the item (5G_n79_2, ANT1) in Table 1 (i.e., subtract 15 from 45). As a result, Table 1 may be updated into Table 6.

TABLE 6

| No. | Radio communication | ANT1 | ANT2 | ANT3 | ANT4 | ANT5 |
|---|---|---|---|---|---|---|
| 2 | WiFi_5G | 45 | 35 | 20 | 0 | 0 |
| | ... | | | | | |
| 4 | WiFi_5G_2 | −55(45-100) | 35 | 20 | 0 | −10(0-10) |
| | ... | | | | | |
| 14 | 5G_n79 | 30(45-15) | 43 | 35 | 35 | 28(38-10) |
| | ... | | | | | |
| 18 | 5G_n79_2 | 30(45-15) | 43 | 35 | 35 | 28(38-10) |

The communication processor 192a may select ANT2 (antenna B 452) as the antenna of "WiFi_5G_2" based on Table 6.

The communication processor 192a may check, in Table 3, that there is no influence of ANT2 exerted on performance of another antenna in a frequency band having the second priority (WiFi_5G_2). When ANT2 is shared by the second priority and the third priority, the communication processor 192a may check, in Table 4, the influence "10" of the second priority (WiFi_5G_2) (aggressor) exerted on the third priority (5G_n79) (victim), and may incorporate the results of the check into the item (5G_n79, ANT2) in Table 1 (i.e., subtract 10 from 43). When ANT2 is shared by the second priority and the fourth priority, the communication processor 192a may check, in Table 4, the influence "10" of the second priority (WiFi_5G_2) (aggressor) exerted on the fourth priority (5G_n79_2) (victim), and may incorporate the results of the check into the item (5G_n79_2, ANT2) in Table 1 (i.e., subtract 10 from 43). As a result, Table 6 may be updated into Table 7.

TABLE 7

| No. | Radio communication | ANT1 | ANT2 | ANT3 | ANT4 | ANT5 |
|---|---|---|---|---|---|---|
| 2 | WiFi_5G | 45 | 35 | 20 | 0 | 0 |
| ... | | | | | | |
| 4 | WiFi_5G_2 | −55 | 35 | 20 | 0 | −10 |
| ... | | | | | | |
| 14 | 5G_n79 | 30 | 33(43-10) | 35 | 35 | 28 |
| ... | | | | | | |
| 18 | 5G_n79_2 | 30 | 33(43-10) | 35 | 35 | 28 |

The communication processor 192a may select ANT3 (antenna C 453) or ANT4 (antenna D 454) as the antenna of "5G_n79" based on Table 7.

The communication processor 192a may check, in Table 3, that there is no influence of ANT3 (antenna C 453) exerted on performance of another antenna in a frequency band having the third priority (5G_n79) on the assumption that ANT3 has been selected as the antenna of "5G_n79." When the third priority and the fourth priority are shared by ANT3, the communication processor 192a may check, in Table 4, the influence "100" of the third priority (5G_n79) (aggressor) exerted on the fourth priority (5G_n79_2) (victim), and may update Table 7 with Table 8 by incorporating the results of the check into the item (5G_n79_2, ANT3) in Table 1 (i.e., subtract 100 from 35).

TABLE 8

| No. | Radio communication | ANT1 | ANT2 | ANT3 | ANT4 | ANT5 |
|---|---|---|---|---|---|---|
| 2 | WiFi_5G | 45 | 35 | 20 | 0 | 0 |
| ... | | | | | | |
| 4 | WiFi_5G_2 | −55 | 35 | 20 | 0 | −10 |
| ... | | | | | | |
| 14 | 5G_n79 | 30 | 33 | 35 | 35 | 28 |
| ... | | | | | | |
| 18 | 5G_n79_2 | 30 | 33 | −65(35-100) | 35 | 28 |

The communication processor 192a may select ANT4 (antenna D 454) as the antenna of "5G_n79_2" based on Table 8.

Referring to 530 in FIG. 5, the communication processor 192a may close a third switch 433 corresponding to ANT3 (antenna C 453) and a fourth switch 434 corresponding to ANT4 (antenna D 454). The communication processor 192a may open switches 431, 432, and 435 corresponding to antennas 451, 452, and 455 unselected as the antennas of "5G-n79" and "5G_n79_2."

As described above, the communication processor 192a may change an RFFE to support 5G network communication (e.g., 5G_n79) from a (1-1)-th RFFE 441a and (1-2)-th RFFE 441b to a (1-3)-th RFFE 441c and (1-4)-th RFFE 441d based on a change in a communication method (e.g., activation (520) of WiFi_5G). As if an RFFE physically hops between modules within a communication circuit, an RFFE to support a designated radio communication (e.g., 5G network communication) may be changed.

Figure 6:
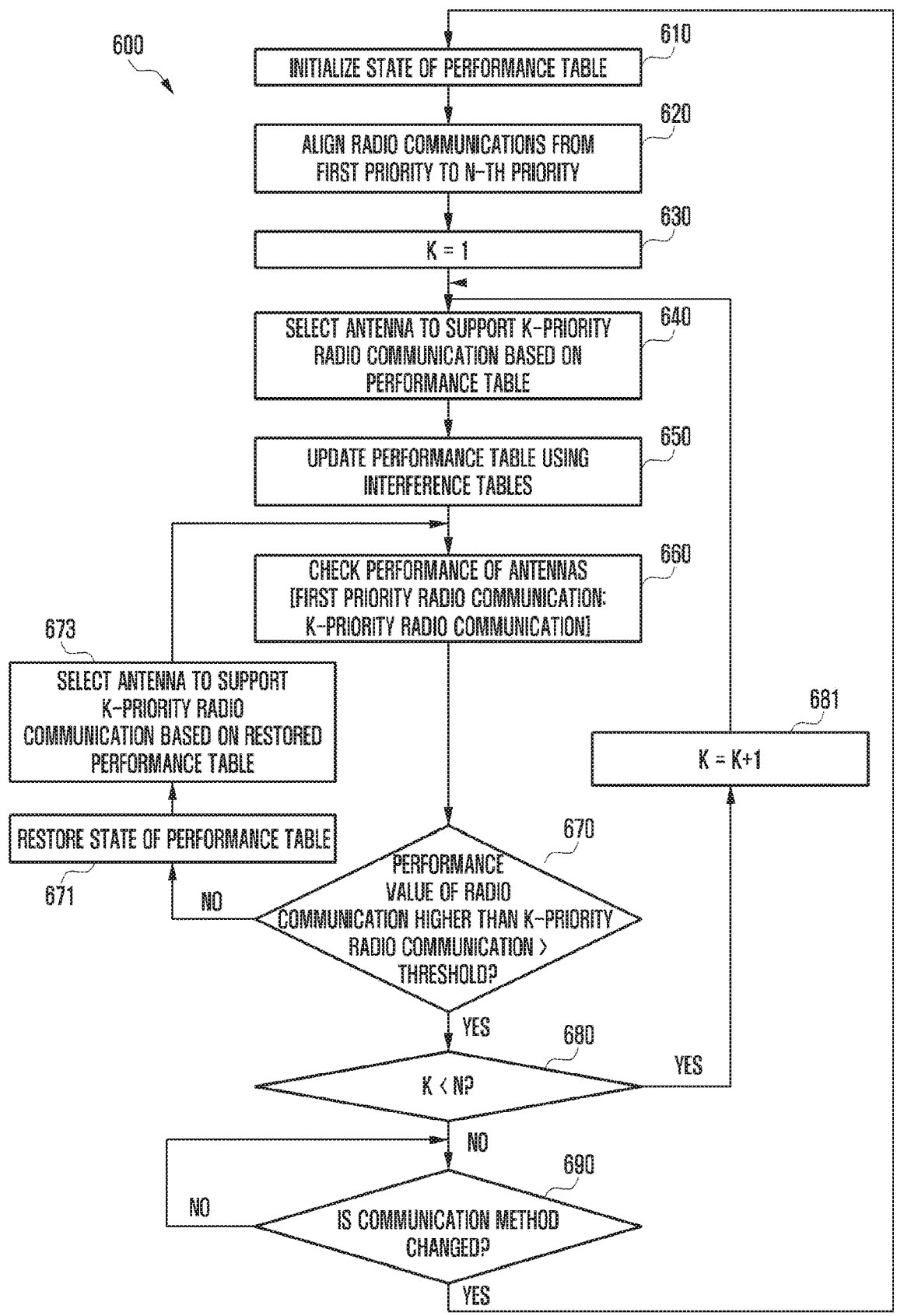
FIG. 6 is a flowchart for selecting an antenna to support radio communication, according to an embodiment.

FIG. 6 is a flowchart 600 for selecting an antenna to support radio communication, according to an embodiment. Referring to FIG. 6, the steps 600 may be executed as the electronic device 101 is booted.

At step 610, the communication processor 192a may initialize the state of the performance table 361 as a state (e.g., Table 1) when the performance table 361 is first stored in the memory 130.

At step 620, the communication processor 192a may align N radio communications to be activated from the first priority to the N-th priority based on the priority table 362 (e.g., Table 2).

At step 630, the communication processor 192a may designate 1 to K as an index for antenna selection.

At step 640, the communication processor 192a may select an antenna to support radio communication having the K priority among antennas based on the performance table 361. The communication processor 192a may select, as an antenna to support the radio communication having the K priority, the best antenna that belongs to the antennas and that has the highest performance.

At step 650, the communication processor 192a may update the performance table 361 using the interference tables 363 and 364 based on the selection of the antenna to support the radio communication having the K priority. The communication processor 192a may check, in the first interference table 363 (e.g., Table 3), first interference values indicative of the influence of the selected antenna exerted on performance of other antennas in a frequency band designated to be used for the radio communication having the K priority. The communication processor 192a may check, in the second interference table 364 (e.g., Table 4), second interference values indicative of the influence of the K-th-priority radio communication (aggressor) exerted on lower-priority radio communication (victim) when the K-th-priority radio communication shares the selected antenna with each of the lower-priority radio communications and/or the influence of the K-th-priority radio communication (aggressor) exerted on higher-priority (already selected for communication) communication. The communication processor 192a may update the performance table 361 by incorporating the checked first interference values and second interference values into the performance table 361.

At step 660, the communication processor 192a may check, in the updated performance table 361, a value indicative of each of pieces of antenna performance from an antenna selected to support the first priority radio communication to an antenna selected to support the K-th-priority radio communication through the execution of step 650.

At step 670, the communication processor 192a may check whether the checked value indicative of performance of an antenna selected to support radio communication having a priority higher than the K-th-priority radio communication is smaller than a set threshold. The lower limit of antenna performance may be set for each radio communication and stored in the memory 130. In order to perform step 670, the communication processor 192a may check, in the memory 130, a lower limit corresponding to higher-priority radio communication.

At step 671, the communication processor 192a may restore the state of the performance table 361 to a state before step 650 is performed based on the check of the performance value of the higher-priority radio communication being smaller than the threshold ("N" at step 670). At step 673, the communication processor 192a may select an antenna to support the radio communication having the K-th-priority, among other antennas except the antenna selected at step 640, based on the restored performance table 361. The communication processor 192a may select, as an antenna to support the radio communication having the K priority, the best antenna among the remaining antennas except the best antenna having the best performance among the antennas. After performing steps 671 and 673, the communication processor 192a may perform step 660 again.

At step 680, the communication processor 192a may check whether K is smaller than N based on the check of the performance value of the higher-priority radio communication being greater than the threshold ("YES" at step 670). If K has been set to 1, after performing step 650, the communication processor 192a may perform step 680 without performing step 660 and step 670.

When K is smaller than N ("YES" at step 680), at operation 681, the communication processor 192a may update K into K+1 and perform step 640 again.

When K is equal to N ("NO" at step 680), at step 690, the communication processor 192a may identify whether a communication method has been changed. A change in the communication method may include that any one of N radio communications has been deactivated. The communication processor 192a may recognize the deactivation based on a control signal received from the processor 120 (e.g., an AP). A change in the communication method may include that another radio communication other than N radio communications has been activated. The communication processor 192a may recognize the activation based on a control signal received from the processor 120. The communication processor 192a may perform step 610 based again on a change in the communication method ("YES" at step 690). The communication processor 192a may recognize a change in the method for a user to use the electronic device 101, and may perform step 610 again.

According to an embodiment, an electronic device may include a first antenna, a second antenna spaced apart from the first antenna, a first RFFE electrically connected to the first antenna and configured to pre-process an RF signal having a frequency belonging to a first frequency band, a second RFFE connected to the second antenna and configured to pre-process an RF signal having a frequency belonging to a second frequency band different from the first frequency band, a third RFFE and a fourth RFFE configured to pre-process an RF signal having a frequency belonging to a third frequency band different from the first frequency band and the second frequency band, a first switch positioned in a first conductive path electrically connecting the first antenna and the third RFFE, a second switch positioned in a second conductive path electrically connecting the second antenna and the fourth RFFE, and a communication processor electrically connected to the first switch and the second switch and configured to control the first switch and the second switch and to transmit and/or receive a signal having a frequency belonging to at least one of the first frequency band, the second frequency band and the third frequency band.

The electronic device may further include a memory operatively coupled to the communication processor. The memory stores instructions that, when executed, cause the communication processor to determine a state having better performance of an antenna among the state in which the third RFFE has been connected to the first antenna and the state in which the fourth RFFE has been connected to the second antenna when communication using the third frequency band is performed and to control the first switch or the second switch based on the determination.

The memory stores a performance table indicative of performance of the antennas for radio communications. The third RFFE and the fourth RFFE support a first radio communication, and the first RFFE and the second RFFE support a second radio communication. The memory stores instructions that, when executed, cause the communication processor to select an antenna to support the first radio communication among the antennas based on the performance table.

The memory stores a priority table indicating that the second radio communication has higher priority than the first radio communication, a first interference table indicative of the influence of each antenna exerted on performance of another antenna, and a second interference table indicative of the influence of one radio communication exerted on performance of another radio communication when one antenna is shared by two radio communications. The instructions, when executed, cause the communication processor to select an antenna to support the second radio communication among the antennas based on the performance table, to update the performance table using the interference tables based on the selection of the second antenna to support the second radio communication, and to select an antenna to support the first radio communication among the antennas based on the updated performance table.

The instructions, when executed, cause the communication processor to initialize the state of the performance table as a state checked in the memory while the electronic device is booted and to select the antenna to support the second radio communication among the antennas based on the initialized performance table.

The instructions, when executed, cause the communication processor to perform the initialization of the performance table based on a change in a communication method. A change in the communication method may include a change in the type of radio communication to be activated and/or a change in a frequency band designated to be used in radio communication.

The electronic device further includes an application processor. The instructions, when executed, cause the communication processor to recognize a change in the communication method based on a control signal received from the application processor.

The instructions, when executed, cause the communication processor to obtain the tables from the application processor while the electronic device is booted by the application processor.

The instructions, when executed, cause the communication processor to select, as the antenna to support the first radio communication, the best antenna having the highest performance among the antennas based on the updated performance table.

The instructions, when executed, cause the communication processor to recognize that performance of the antenna selected to support the second radio communication does not satisfy a given threshold based on the updated performance table, to restore the state of the updated performance table to a state prior to the update based on the recognition, and to select, as an antenna to support the first radio communication, the best antenna among the remaining antennas except the best antenna indicative of the highest performance among the antennas based on the restored performance table.

The instructions, when executed, cause the communication processor to check, in the first interference table, first interference values indicative of the influence of an antenna, selected to support the second radio communication, exerted on performance of other antennas in a frequency band designated to be used in the second radio communication, to check, in the second interference table, second interference values indicative of the influence of the second radio communication exerted on the first radio communication when the antenna selected to support the second radio communication is shared by the first radio communication and the second radio communication, and to update the performance table by incorporating the first interference values and the second interference values into the performance table.

The third RFFE and the fourth RFFE may be configured to pre-process an RF signal having a frequency belonging to a frequency band designated to be used in 5G network communication as the third frequency band.

One of the first RFFE and the second RFFE may be configured to support WiFi communication, and the other of the first RFFE and the second RFFE may be configured to pre-process an RF signal having a frequency belonging to a frequency band designated to be used in LTE communication.

The instructions, when executed, cause the communication processor to recognize an RFFE to support the WiFi communication among the first RFFE and the second RFFE based on information received from the application processor.

The third frequency band may include 3.3~4.2 GHz and/or 4.4~5 GHz.

The third RFFE and the fourth RFFE may include a reception circuit for the 5G network communication.

The reception circuit may include a SAW filter and a low noise amplifier. According to an embodiment, an electronic device includes antennas, first RFFEs configured to pre-process a an RF signal having a frequency belonging to a first frequency band, second RFFEs connected to the antennas, respectively, wherein at least one of the second RFFEs is configured to pre-process an RF signal having a frequency belonging to a second frequency band different from the first frequency band, switches selectively connecting the first RFFEs to the respective antennas, a communication processor operatively coupled to the first RFFEs, the second RFFEs and the switches, and a memory operatively coupled to the communication processor. The memory stores instructions that, when executed, cause the communication processor to select a first antenna to support radio communication using the first frequency band among the antennas and to control the switches to connect one of the first RFFEs to the first antenna and to open a connection between the remainder of the first RFFEs and the remainder of the antennas.

The memory may store a performance table indicative of performance of the antennas for radio communications. The first RFFEs may support a first radio communication. The second RFFEs may support a second radio communication. The instructions, when executed, cause the communication processor to select an antenna to support the first radio communication among the antennas based on the performance table.

The memory may store a priority table indicative of the second radio communication having higher priority than the first radio communication, a first interference table indicative of the influence of each antenna exerted on performance of another antenna, and a second interference table indicative of the influence of one radio communication exerted on performance of another radio communication when one antenna is shared by two radio communications. The instructions, when executed, cause the communication processor to select a second antenna to support the second radio communication among the antennas based on the performance table, to update the performance table using the interference tables based on the selection of the second antenna to support the second radio communication, and to select a first antenna to support the first radio communication among the antennas based on the updated performance table.

According to various embodiments, the number of electronic parts, such as a diplexer and an extractor, can be reduced. Accordingly, optimal antenna performance can be achieved in an electronic device by reducing a loss of an RF signal.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a first antenna;
   a second antenna spaced apart from the first antenna;
   a first radio frequency front end (RFFE) electrically connected to the first antenna and configured to process a radio frequency (RF) signal having a frequency belonging to a first frequency band;
   a second RFFE electrically connected to the second antenna and configured to process an RF signal having a frequency belonging to a second frequency band different from the first frequency band;
   a third RFFE and a fourth RFFE configured to process an RF signal having a frequency belonging to a third frequency band different from the first frequency band and the second frequency band;
   a first switch positioned in a first conductive path electrically connecting the first antenna and the third RFFE;
   a second switch positioned in a second conductive path electrically connecting the second antenna and the fourth RFFE;
   a communication processor electrically connected to the first switch and the second switch, and
   a memory operatively coupled to the communication processor and configured to store performance information having, at least, a first value indicating an efficiency of the first antenna when performing a first radio communication, and a second value indicating an efficiency of the second antenna when performing the first radio communication,
   wherein the memory is configured to store instructions that, when executed, cause the communication processor to:
   control the first switch and the second switch and to transmit or receive a signal having a frequency belonging to at least one of the first frequency band, the second frequency band or the third frequency band, and
select an antenna to support the first radio communication among the first antenna and the second antenna based on the performance information having the first value or the second value,
wherein the third RFFE and the fourth RFFE support the first radio communication, and the first RFFE and the second RFFE support the second radio communication.

2. The electronic device of claim 1,
wherein the memory stores instructions that, when executed, cause the communication processor to, as a part of selecting the antenna to support the first radio communication,
determine, based on the performance information, a state having better performance of an antenna among a state in which the third RFFE has been connected to the first antenna and a state in which the fourth RFFE has been connected to the second antenna when communication using the third frequency band is performed and to control the first switch or the second switch based on the determination.

3. The electronic device of claim 2, wherein:
the memory stores priority information indicative of the second radio communication having higher priority than the first radio communication, first interference inforamtion indicative of an influence of each antenna exerted on performance of another antenna, and second interference information indicative of an influence of one radio communication exerted on performance of another radio communication when one antenna is shared by two radio communications, and
wherein the instructions, when executed, further cause the communication processor to select an antenna to support the second radio communication among the antennas based on the performance information, to update the performance information using the first interference information and the second interference information based on the selection of the second antenna to support the second radio communication, and to select an antenna to support the first radio communication among the antennas based on the updated performance information.

4. The electronic device of claim 3, wherein the instructions, when executed, further cause the communication processor to:
initialize a state of the performance information as a state checked in the memory while the electronic device is booted, and
select the antenna to support the second radio communication among the antennas based on the initialized performance information.

5. The electronic device of claim 4, wherein:
the instructions, when executed, further cause the communication processor to perform the initialization of the performance information based on a change in a communication method, and
wherein the change in the communication method comprises a change in a type of radio communication to be activated and/or a change in a frequency band designated to be used in radio communication.

6. The electronic device of claim 5, further comprising an application processor,
wherein the instructions, when executed, further cause the communication processor to recognize the change in the communication method based on a control signal received from the application processor.

7. The electronic device of claim 3, further comprising an application processor,
wherein the instructions, when executed, further cause the communication processor to obtain the performance information, the first interference information and the second interference information from the application processor while the electronic device is booted by the application processor.

8. The electronic device of claim 3, wherein the instructions, when executed, further cause the communication processor to select, as the antenna to support the first radio communication, a best antenna having a highest performance among the antennas based on the updated performance information.

9. The electronic device of claim 3, wherein the instructions, when executed, further cause the communication processor to:
recognize that performance of the antenna selected to support the second radio communication does not satisfy a given threshold based on the updated performance information.
restore a state of the updated performance information to a state prior to the update based on the recognition, and
select, as an antenna to support the first radio communication, a best antenna among remaining antennas except a best antenna indicative of highest performance among the antennas based on the restored performance information.

10. The electronic device of claim 3, wherein the instructions, when executed, further cause the communication processor to:
check, in the first interference information, first interference values indicative of an influence of an antenna, selected to support the second radio communication, exerted on performance of other antennas in a frequency band designated to be used in the second radio communication,
check, in the second interference information, second interference values indicative of an influence of the second radio communication exerted on the first radio communication when the antenna selected to support the second radio communication is shared by the first radio communication and the second radio communication, and
update the performance information by incorporating the first interference values and the second interference values into the performance information.

11. The electronic device of claim 1, wherein the third RFFE and the fourth RFFE are configured to process a radio frequency (RF) signal having a frequency belonging to a frequency band designated to be used in fifth generation (5G) network communication as the third frequency band.

12. The electronic device of claim 11, wherein:
one of the first RFFE and the second RFFE is configured to support wireless fidelity (WiFi) communication, and
the other of the first RFFE and the second RFFE is configured to process an RF signal having a frequency belonging to a frequency band designated to be used in long term evolution (LTE) communication.

13. The electronic device of claim 12, further comprising an application processor,
wherein the instructions, when executed, further cause the communication processor to recognize an RFFE to support the WiFi communication among the first RFFE and the second RFFE based on information received from the application processor.

14. The electronic device of claim 11, wherein the third frequency band comprises 3.3~4.2 GHz and/or 4.4~5 GHz.

15. The electronic device of claim 11, wherein the third RFFE and the fourth RFFE comprise a reception circuit for the 5G network communication.

16. The electronic device of claim 15, wherein the reception circuit comprises a surface acoustic wave (SAW) filter and a low noise amplifier.

17. An electronic device comprising:
- antennas;
- first radio frequency front ends (RFFEs) supporting a first radio communication, wherein the first RFFEs are configured to process a radio frquency (RF) signal having a frequency belonging to a first frequency band;
- second RFFEs supporting a second radio communication, wherein the second RFFEs are electrically connected to the antennas, respectively, wherein at least one of the second RFFEs is configured process an RF signal having a frequency belonging to a second frequency band different from the first frequency band;
- switches selectively connecting the first RFFEs to the respective antennas;
- a communication processor electrically coupled to the first RFFEs, the second RFFEs and the switches; and
- a memory operatively coupled to the communication processor and configured to store performance information having at least a plurality of values respectively indicating efficiencies of the antennas when performing the first radio communication,
- wherin the memory is configured to store instructions that, when executed, cause the communication processor to:
  - select a first antenna among the antennas to support the first radio communication using the first frequency band among the antennas based on the performance information having the plurality of values, and
  - control the switches to connect one of the first RFFEs to the first antenna and to open a connection between a remainder of the first RFFEs and a remainder of the antennas.

18. The electronic device of claim 17, wherein:
- the memory stores priority information indicative of the second radio communication having higher priority than the first radio communication, first interference information indicative of an influence of each antenna exerted on performance of another antenna, and second interference information indicative of an influence of one radio communication exerted on performance of another radio communication when one antenna is shared by two radio communications, and
- wherein the instructions, when executed, further cause the communication processor to select a second antenna to support the second radio communication among the antennas based on the performance information, to update the performance information using the first interference information and the second interference information based on the selection of the second antenna to support the second radio communication, and to select the first antenna to support the first radio communication among the antennas based on the updated performance information.

* * * * *